US009056585B2

(12) United States Patent
Kelly

(10) Patent No.: US 9,056,585 B2
(45) Date of Patent: Jun. 16, 2015

(54) GOLF CART BAG STRAP SLEEVE

(71) Applicant: David M. Kelly, Vero Beach, FL (US)

(72) Inventor: David M. Kelly, Vero Beach, FL (US)

(73) Assignee: Kelly Line Enterprises, LLC, Vero Beach, FL (US)

( * ) Notice: Subject to any disclaimer, the term of this patent is extended or adjusted under 35 U.S.C. 154(b) by 161 days.

(21) Appl. No.: 13/910,724

(22) Filed: Jun. 5, 2013

(65) Prior Publication Data

US 2013/0264365 A1 Oct. 10, 2013

Related U.S. Application Data

(63) Continuation-in-part of application No. 12/855,122, filed on Aug. 12, 2010, now Pat. No. 8,474,671.

(51) Int. Cl.

| | |
|---|---|
| ***B60R 9/00*** | (2006.01) |
| ***B60R 9/08*** | (2006.01) |
| ***G09F 23/00*** | (2006.01) |
| *A63B 55/00* | (2006.01) |
| *A63B 55/08* | (2006.01) |

(52) U.S. Cl.
CPC . *B60R 9/08* (2013.01); *A63B 55/00* (2013.01); *G09F 23/0066* (2013.01); *A63B 55/08* (2013.01)

(58) Field of Classification Search
CPC .......................... A63B 55/008; A63B 57/0087
USPC ........................................... 224/274; D12/16
See application file for complete search history.

(56) References Cited

U.S. PATENT DOCUMENTS

| | | | | |
|---|---|---|---|---|
| 5,590,773 | A * | 1/1997 | Robinett | 206/315.1 |
| 5,590,775 | A * | 1/1997 | Moore | 206/423 |
| 5,927,489 | A * | 7/1999 | Carswell | 206/315.1 |
| 5,975,390 | A * | 11/1999 | Saroli | 224/274 |
| 6,085,695 | A * | 7/2000 | Miller et al. | 119/795 |
| 6,126,050 | A * | 10/2000 | Aliano, Jr. | 224/274 |
| 6,202,263 | B1 * | 3/2001 | Harker | 24/300 |
| 7,219,388 | B2 * | 5/2007 | Hale | 15/209.1 |
| 7,344,308 | B2 * | 3/2008 | Meyer et al. | 383/41 |
| 2004/0021340 | A1 * | 2/2004 | Beusse et al. | 296/136.07 |
| 2006/0202503 | A1 * | 9/2006 | Tyrer | 296/100.14 |

* cited by examiner

*Primary Examiner* — Brian D Nash
*Assistant Examiner* — Derek Battisti
(74) *Attorney, Agent, or Firm* — Richard Blakely Glasgow

(57) ABSTRACT

A protective golf cart bag strap sleeve system which includes a sleeve and a golf cart bag strap, wherein the sleeve comprises a first layer of durable material; a second layer of padding; and a third layer of durable material, wherein the first layer, the second layer, and the third layer are folded over to form a folded edge, wherein the first layer, the second layer, and the third layer are fastened opposite the folded edge to form a sleeve having a first open end and a second open end, wherein the sleeve receives the golf cart bag strap between the first open end and the second open end of the sleeve.

8 Claims, 3 Drawing Sheets

FIG. 1
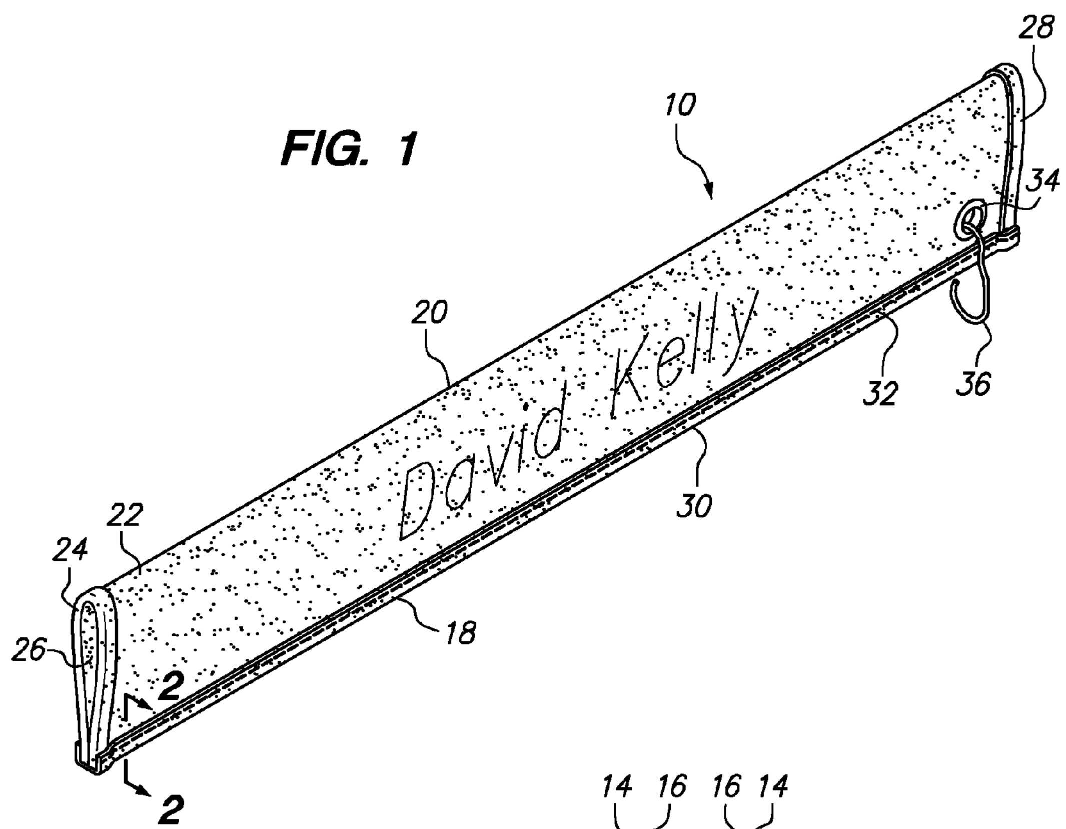
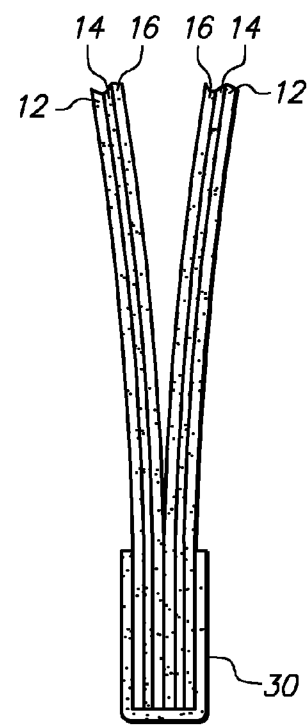
FIG. 2

10
38
28
34
20
30
David Kelly
32
36
30
40
26
18

28
10
30
34
20
David Kelly
32
36
22
24
26
18
30

GOLF CART BAG STRAP SLEEVE

CROSS-REFERENCE TO RELATED APPLICATIONS

This application is a continuation-in-part of, and claims the benefit of, currently pending U.S. application Ser. No. 12/855,122, filed on Aug. 12, 2010, entitled "Golf Cart Bag Strap Sleeve," the disclosure of which is incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention relates to golf cart bag straps, and in particular, to a padded sleeve for such straps.

2. Brief Description of the Related Art

One of the essential features of a golf cart is the bag rack on the back on the cart. Golf cart bag racks are well-known in the prior art. U.S. Pat. No. 2,822,969 to Cooper teaches a golf cart rack with retaining straps that thread through a buckle to secure the golf bag to the golf cart. Likewise, U.S. Pat. No. 4,533,013 to Hightower teaches a motorized golf cart with straps that encircle the upper portion of the golf bag that are received by a buckle to secure the bag to the golf cart. On modern golf carts, the strap and buckle system is still used. The most common straps are made of hard woven nylon.

It has been seen by the inventor that the friction between the hard woven nylon strap and the golf bag causes physical damage to the bag during transport. It would therefore be desirable to develop a padded sleeve that is durable, easily attached and removed from the golf cart bag strap, and is capable of protecting the golf bag from wear and tear due to friction between the strap and the golf bag. The limitations of the prior art are overcome by the present invention as described below.

BRIEF SUMMARY OF THE INVENTION

The present invention is directed to a golf cart bag strap sleeve that is capable of protecting a golf bag from damage due to friction between the strap and the golf bag.

The invention is directed to a golf cart strap sleeve comprising three layers of material, wherein the first and third layers are a durable non-abrasive material suitable for customized advertising and protect the second layer from damage caused by friction due to vibration, and the second layer is made of shock absorbent material such as foam rubber, gel, neoprene, heavy cloth, or any other material suitable for protection against damage caused by friction due to vibration.

It is therefore an object of the present invention to provide for a golf cart bag strap sleeve that is padded and thus will not damage the golf bag when in contact. It is a further object of the present invention to provide for a golf cart strap sleeve that is durable and easily attachable and removable from the golf cart bag strap.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 1 is a perspective view of the first preferred embodiment of the golf cart bag strap sleeve.

FIG. 2 is a cross-sectional view taken along the line of 2-2 of FIG. 1.

DETAILED DESCRIPTION OF THE INVENTION

Figure 3:
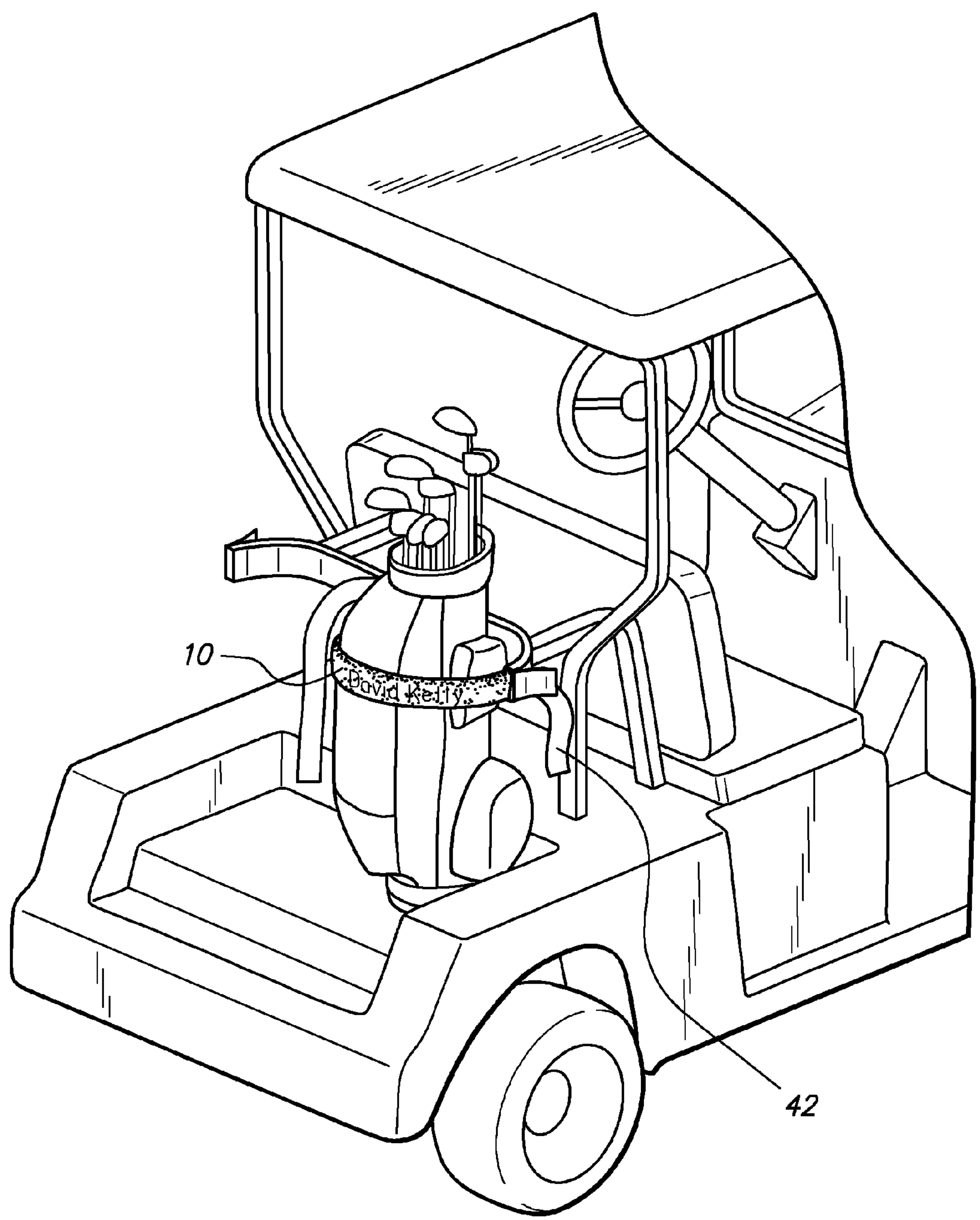
FIG. 3 is a elevational view of a golf cart bearing the golf cart bag strap sleeve.

With reference to FIGS. 1-5, the preferred embodiments of the present invention may be described. Golf cart bag strap sleeve 10 is comprised of three layers: first layer 12, second layer 14, and third layer 16. First layer 12 and third layer 16 are made of a durable non-abrasive material suitable for customized advertising, such as nylon, Lycra, or cotton. These outer layers encapsulate second layer 14, thereby protecting both the second layer 14 and the golf bag from damage due to friction damage caused by vibration. Also, first layer 12 and third layer 16 serve as a canvas for promoting advertising such as the product name, sponsors, or a customer preference.

The second layer 14 is comprised of shock absorbent material such as foam rubber, gel, neoprene or heavy cloth, or other materials that are well-known to those skilled in the art. Second layer 14 lies between first layer 12 and third layer 16. All three layers extend across the entire length and width of the sleeve 10. The second layer 14 is preferably 3-5 mm in thickness.

In the first preferred embodiment, the sleeve 10 is formed by folding said first layer 12, said second layer 14, and said third layer 16 along their middle to form first common edge 18 and second common edge 20. The sleeve 10 has a folded front panel 22 and folded back panel 24 and also has a first open end 26 and a second open end 28. First layer 12, second layer 14, and third layer 16 are received at first common edge 18 by end cover 30. End cover 30 is made of the same material as first layer 12 and third layer 16 to give the sleeve a common and consistent look and feel. End cover 30 prevents the edges of the three layers from fraying and maintains the structural integrity of the sleeve 10. End covers 30 also receive first layer 12, second layer 14, and third layer 16 at the first open end 26 of the front panel 22, the first open end 26 of the back panel 24, the second open end 28 of the front panel 22, and the second open end 28 of the back panel 24. Stitching 32 secures first layer 12, second layer 14, third layer 16, and end cover 30. As an alternative to stitching, the three layers and the end cover can be fastened along the first common edge 18 by other means that would be well-known to those skilled in the art such as Velcro, buttons, zipper, or snaps. Grommet 34 and hook 36 can be used to clip the sleeve 10 onto a golf bag when the sleeve is not in used.

Figure 4:
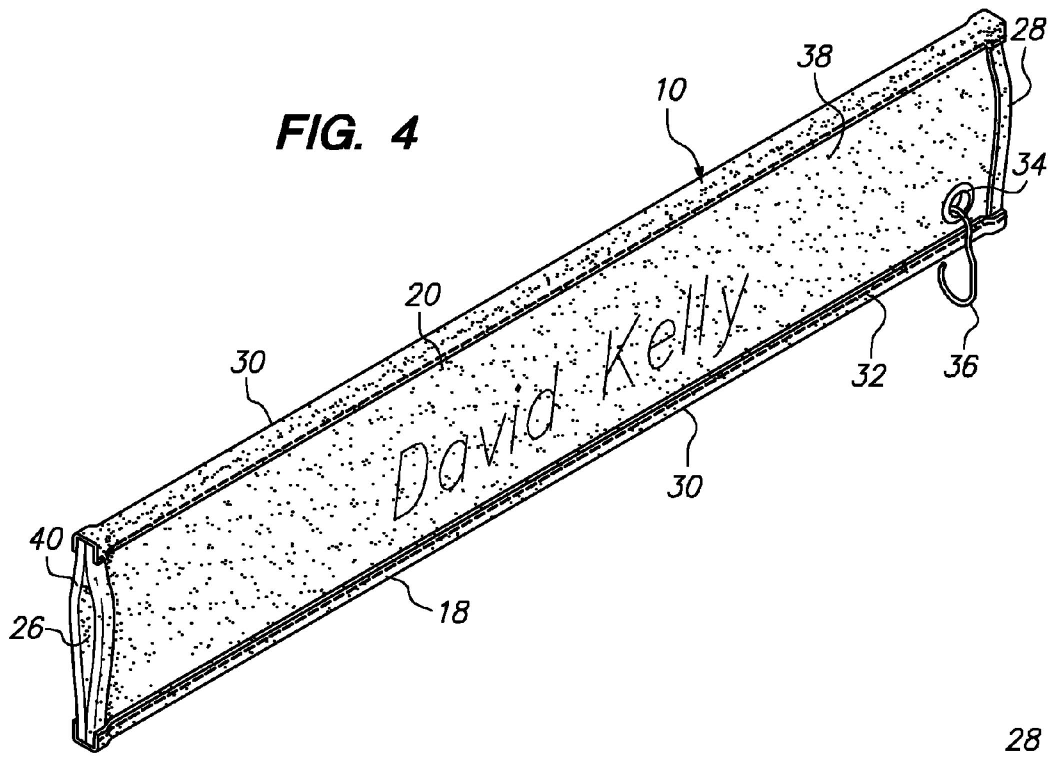
FIG. 4 is a perspective view of the second preferred embodiment of the golf cart bag strap sleeve.

In the second preferred embodiment, the sleeve 10 is not formed by folding over first layer 12, second layer 14, and third layer 16. Instead, as shown in FIG. 4, sleeve 10 is formed by fastening a separate front panel 38 and a separate back panel 40, each panel comprised of the first layer 12, second layer 14, and third layer 16. In this embodiment, end covers 30 receive the three layers along both of their lengths. The separate front panel 38, separate back panel 40, and end covers 30 are fastened to each other by stitching 32 or by other means well-known to those skilled in art such as Velcro, buttons, zipper, or snaps.

Figure 5:
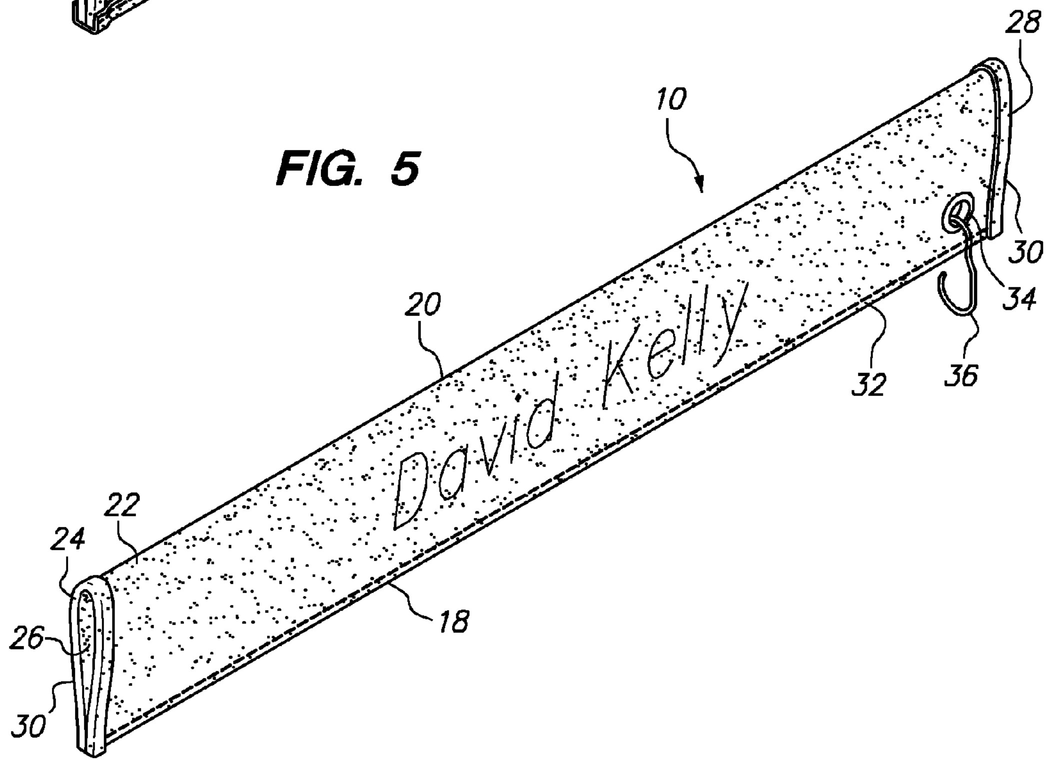
FIG. 5 is a perspective view of the third preferred embodiment of the golf cart bag strap sleeve.

Like in the first embodiment, the sleeve 10 of the third preferred embodiment as shown in FIG. 5 is formed by folding the first layer 12, the second layer 14, and the third layer 16 along their middle to form first common edge 18 and second common edge 20. The sleeve 10 has a folded front panel 22 and folded back panel 24 and also has a first open end 26 and a second open end 28. Stitching secures first layer 12, second layer 14, and third layer 16 at first common edge 18. An adhesive may also be used to fasten the first layer 12, second layer 14, and third layer 16 together prior to stitching. End covers 30 receive first layer 12, second layer 14, and third layer 16 at the first open end 26 of the front panel 22, the first open end 26 of the back panel 24, the second open end 28 of the front panel 22, and the second open end 28 of the back panel 24. End cover 30 is made of the same material as first layer 12 and third layer 16 to give the sleeve a common and consistent look and feel. End cover 30 prevents the edges of the three layers from fraying and maintains the structural integrity of the sleeve 10. Grommet 34 and hook 36 can be used to clip the sleeve 10 onto a golf bag when the sleeve is not in used.

The golf cart strap sleeve is easily attachable and removable. As shown in FIG. 3, the distal end of the golf cart bag strap 42 engages the first open end 26 of the sleeve 10. The strap is easily slidable through the first open end 26 and the second open end 28. Once the strap is completely received by the sleeve 10, the distal end of the strap is inserted into the buckle of the bag rack of the golf cart. The buckle is then closed and the golf bag is thus secure. To remove the sleeve 10, the buckle is opened and the strap is removed from the buckle. The user of the sleeve is then able to pull the sleeve 10 off of the distal end of the strap. The sleeve is sized to snugly receive the entire length of the golf cart bag strap 42 that would be exposed to the golf bag.

The present invention has been described with reference to certain preferred and alternative embodiments that are intended to be exemplary only and not limiting to the full scope of the present invention as set forth in the appended claims.

What is claimed is:

1. A protective golf cart bag strap sleeve system comprising a sleeve and a golf cart bag strap, wherein said sleeve comprises a first layer of durable material; a second layer of padding; and a third layer of durable material, wherein said first layer, said second layer, and said third layer are folded over to form a folded edge, wherein said first layer, said second layer, and said third layer are fastened opposite said folded edge to form a sleeve having a first open end and a second open end, wherein said sleeve receives said golf cart bag strap between said first open end and said second open end of said sleeve.

2. The protective golf cart bag strap sleeve system of claim 1 wherein said first layer is comprised of one of nylon, Lycra, or cotton.

3. The protective golf bag strap sleeve system of claim 1 wherein said second layer is comprised of one of foam, rubber, neoprene, or gel padding.

4. The protective golf cart bag strap sleeve system of claim 1 wherein said third layer is comprised of one of nylon, Lycra, or cotton.

5. The protective golf cart bag strap sleeve system of claim 1 further comprising a grommet and a hook.

6. The protective golf cart bag strap sleeve system of claim 1, further comprising a first end cover and a second end cover.

7. The protective golf cart bag strap sleeve system of claim 1, wherein said first layer, said second layer, and said third layer are fastened via stitching.

8. The protective golf cart bag strap sleeve system of claim 7, wherein said first layer, said second layer, and said third layer are fastened via adhesive.

* * * * *